(12) United States Patent
Yasuda

(10) Patent No.: US 7,764,876 B2
(45) Date of Patent: Jul. 27, 2010

(54) IMAGE-PICKUP APPARATUS AND FOCUS CONTROL METHOD

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 11/778,182

(22) Filed: Jul. 16, 2007

(65) Prior Publication Data

US 2008/0025713 A1    Jan. 31, 2008

(30) Foreign Application Priority Data

Jul. 25, 2006    (JP) .............................. 2006-202000

(51) Int. Cl.
G03B 17/00 (2006.01)
G03B 3/00 (2006.01)
G03B 13/00 (2006.01)

(52) U.S. Cl. ......................................... 396/104; 396/80

(58) Field of Classification Search ................. 396/125, 396/104, 80

See application file for complete search history.

(56) References Cited

U.S. PATENT DOCUMENTS 5,597,999 A    1/1997    Kinba et al.

| | | | |
|---|---|---|---|
| 2003/0081137 A1 * | 5/2003 | Yamazaki | 348/354 |
| 2004/0202461 A1 * | 10/2004 | Nakahara | 396/104 |
| 2005/0052564 A1 * | 3/2005 | Ishii | 348/345 |
| 2005/0168622 A1 * | 8/2005 | Kawai et al. | 348/360 |
| 2005/0185083 A1 * | 8/2005 | Okawara | 348/345 |

FOREIGN PATENT DOCUMENTS

JP    2002-258147 A    9/2002

OTHER PUBLICATIONS

The above references were cited in an Apr. 21, 2008 Extended European Search Report issued in the counterpart European Patent Application No. 07113138.7, which is enclosed.

* cited by examiner

*Primary Examiner*—W. B. Perkey
*Assistant Examiner*—Noam Reisner
(74) *Attorney, Agent, or Firm*—Cowan, Liebowitz & Latman, P.C.

(57) ABSTRACT

An image-pickup apparatus includes a first detector generating first information corresponding to a contrast state, a focus lens controller, a second detector outputting second information used for calculating an in-focus position, and a focus lens position detector. If the difference between the detected focus lens position and the calculated in-focus position is equal to or greater than a first value, the controller moves the focus lens towards the calculated in-focus position, and if the difference is less than the first value, the controller repeats focus control using the first information without using the second information. The apparatus reduces discontinuous movements of the focus lens.

5 Claims, 6 Drawing Sheets

IMAGE-PICKUP APPARATUS AND FOCUS CONTROL METHOD

BACKGROUND OF THE INVENTION

The present invention relates to an image-pickup apparatus such as a video camera or a digital still camera and, more particularly, to a focus control method in the image-pickup apparatus.

A mainstream method in auto-focus (AF) control of a video camera or the like is a TV-AF method which generates an AF evaluation value signal indicating the sharpness (contrast state) of image signals generated using an image-pickup element and searches for the position of the focus lens where the AF evaluation value signal is at the maximum.

AF methods include an external ranging method (or an external phase difference detection method) in which an in-focus position of the focus lens is calculated from the distance to an object (object distance) detected by a ranging sensor provided independently of an image-pickup lens, and then the focus lens is moved to the in-focus position.

In the external phase difference detection method, a light flux received from an object is divided into two, and the two divided light fluxes are respectively received by a pair of light-receiving element arrays (line sensors). The amount of shift between images formed on the pair of line sensors, i.e., a phase difference is detected, an object distance is calculated from the phase difference by triangulation, and the focus lens is moved to an in-focus position with respect to the object distance.

There is also available an internal phase difference detection method. In the internal phase difference detection method, a light flux having passed through the exit pupil of an image-pickup lens is divided into two, and the two divided light fluxes are respectively received by a pair of line sensors. A phase difference between two images on the pair of line sensors is detected, and the amount of defocusing of an image-pickup lens is calculated from the phase difference. Then, the focus lens is moved by an amount corresponding to the amount of defocusing.

A hybrid AF method in which these AF methods are combined to make full use of high focusing accuracy of a TV-AF method and high-speed focusing of a phase difference detection method has been disclosed in Japanese Patent Laid-Open No. 2005-84426. The hybrid AF method disclosed in Japanese Patent Laid-Open No. 2005-84426 is a method in which an in-focus state is achieved by the phase difference detection method when it is determined that an in-focus state cannot be achieved by the TV-AF method because an object has low luminance or low contrast.

An image-pickup apparatus which, in the phase difference detection method, calculates the degree of coincidence between image patterns, i.e., to what degree two images on line sensors are similar to or coincide with each other, and determines the reliability of a ranging result on the basis of the degree has been disclosed in Japanese Patent No. 3548184.

An image-pickup lens for the latest video cameras can be easily reduced in size and weight and is excellent in optical characteristics. Accordingly, an image-pickup lens of the inner focus type in which a focus lens is arranged closer to an image plane than a magnification-varying lens has become the mainstream.

In an image-pickup lens of the inner focus type, the position of the focus lens where an in-focus state is achieved with respect to the same object distance varies depending on the position of the magnification-varying lens, as shown in FIG. 6. The moving amount of the focus lens with respect to the same change of the object distance (e.g., infinity to 1 m) varies depending on the position of the magnification-varying lens, as indicated by a curve D in FIG. 7. In particular, the moving amount of the focus lens tends to be larger on the telephoto side than on the wide-angle side.

However, in a conventional hybrid AF method, the focus control by the TV-AF method is first performed, and then it is determined whether or not to perform the focus control by the phase difference detection method on the basis of the state of the focus control by the TV-AF method. For this reason, the conventional hybrid AF method does not make full use of the features of the phase difference detection method, so that responsive high-speed focus control is not sufficiently realized.

If movement of the focus lens to an in-focus position, (which includes one calculated from a driving amount) caused by a change in the in-focus position calculated by the phase difference detection method is repeated, the focus lens may be moved frequently and discontinuously. This may make a captured image unstable.

SUMMARY OF THE INVENTION

The present invention provides an image-pickup apparatus and a focus control method capable of performing focus control with good responsiveness, at high speed, and with high focusing accuracy while suppressing discontinuous movements of the focus lens.

As one aspect, the present invention provides an image-pickup apparatus comprising a first detector which generates first information corresponding to a contrast state of a captured image, a controller which repeatedly controls a focus lens using the first information, a second detector which outputs second information that is different from the first information and is used for calculating one of an in-focus position and a driving amount of the focus lens, and a position detector which detects a position of the focus lens. While the controller is repeating the control of the focus lens using the first information, if a difference between the position of the focus lens detected by the position detector and the in-focus position calculated using the second information is equal to or greater than a first value, the controller moves the focus lens towards the calculated in-focus position, and if the difference is less than the first value, the controller repeats the control of the focus lens using the first information without using the second information.

As another aspect, the present invention provides a focus control method comprising the steps of acquiring first information corresponding to a contrast state of a picked-up image, repeatedly controlling a focus lens using the first information, acquiring second information that is different from the first information and which is used for calculating one of an in-focus position and a driving amount of the focus lens, and detecting a position of the focus lens. In the control step, while the control of the focus lens using the first information is repeated, if a difference between the detected position of the focus lens and the in-focus position calculated using the second information is equal to or greater than a first value, the focus lens is moved towards the calculated in-focus position, and if the difference is less than the first value, the control of the focus lens using the first information is repeated without using the second information.

Other objects and features of the present invention will be apparent from the preferred embodiment described below with reference to the drawings.

DESCRIPTION OF THE EMBODIMENTS

A preferred embodiment of the present invention will now be described with reference to the accompanying drawings.

Figure 1:
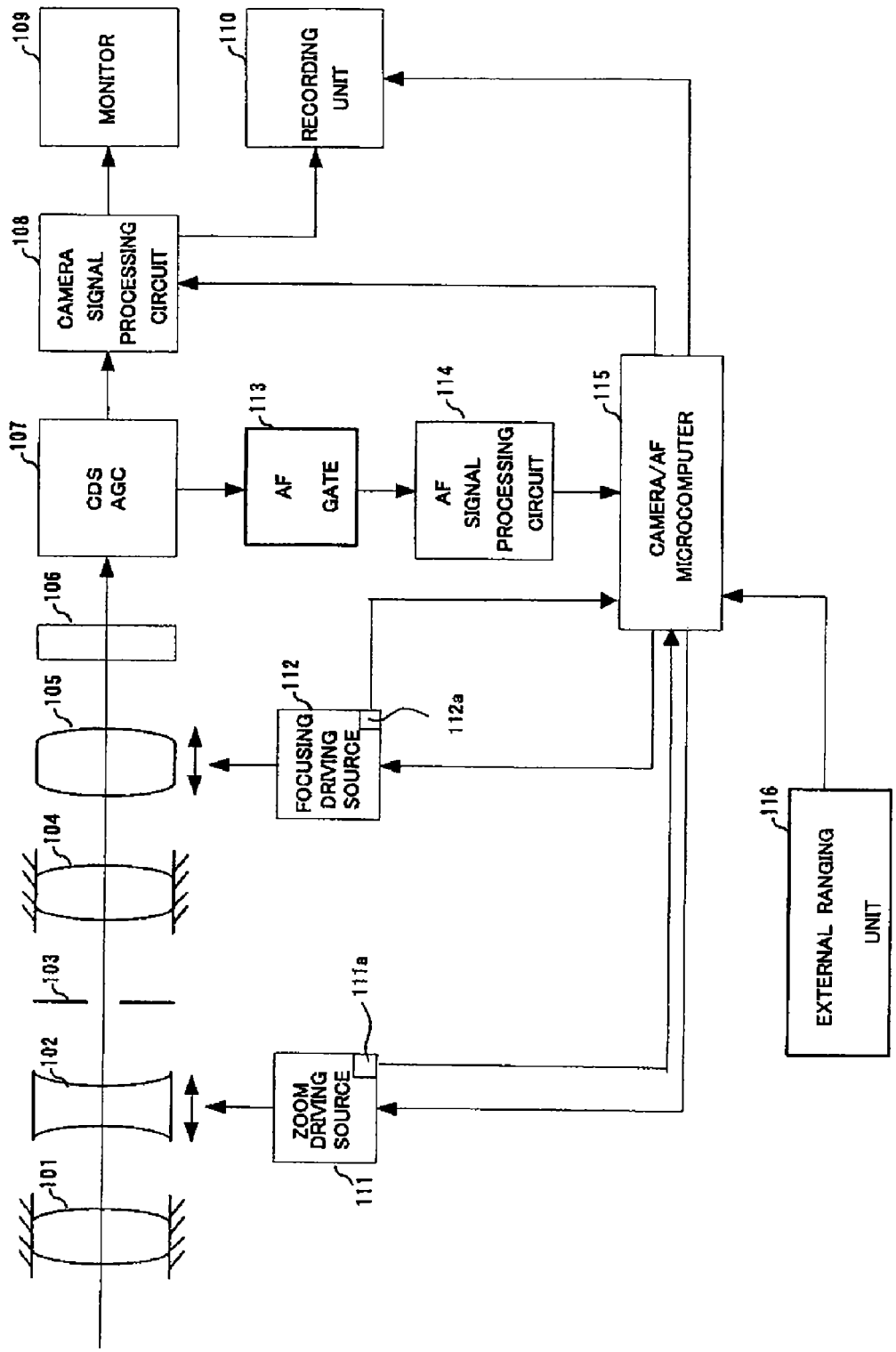
FIG. 1 is a block diagram showing the configuration of a video camera that is an embodiment of the present invention.

FIG. 1 shows the configuration of a video camera (image-pickup apparatus) that is an embodiment of the present invention. Note that although a description of a video camera will be given in this embodiment, alternative embodiments of the present invention include any other image-pickup apparatus such as a digital still camera.

In FIG. 1, reference numeral 101 denotes a first fixed lens, 102 denotes a magnification-varying lens which moves along an optical axis to vary the magnification, and 103 denotes a stop. Reference numeral 104 denotes a second fixed lens, and 105 denotes a focus/compensator lens (hereinafter referred to as a focus lens) which compensates for movement of the focal plane caused when the magnification is varied, and has a focusing function. The first fixed lens 101, magnification-varying lens 102, stop 103, second fixed lens 104, and focus lens 105 constitute an image-pickup optical system. The image-pickup optical system of this embodiment is a zoom lens of the rear focus type.

Reference numeral 106 denotes an image-pickup element as a photoelectric conversion element which is constituted by a CCD sensor or a CMOS sensor. Reference numeral 107 denotes a CDS/AGC circuit which samples outputs from the image-pickup element 106 and performs gain adjustment.

Reference numeral 108 denotes a camera signal processing circuit which performs various image processes on an output signal from the CDS/AGC circuit 107 to generate an image signal.

Reference numeral 109 denotes a monitor which is constituted by an LCD or the like and which displays an image signal from the camera signal processing circuit 108.

Reference numeral 110 denotes a recording unit which records an image signal from the camera signal processing circuit 108 on a recording medium such as a magnetic tape, an optical disc, or in a semiconductor memory.

Reference numeral 111 denotes a zoom driving means for moving the magnification-varying lens 102. Reference numeral 112 denotes a focusing driving means for moving the focus lens 105. The zoom driving means 111 and the focusing driving means 112 are each constituted by an actuator such as for example a stepping motor, a DC motor, a vibration type motor, or a voice coil motor.

The zoom driving means 111 includes a zoom position detector 111a such as an encoder for detecting the position of the magnification-varying lens 102, i.e., the focal length of the image-pickup optical system.

The focusing driving means 112 includes a focus position detector 112a such as an encoder for detecting the position of the focus lens 105.

Reference numeral 113 denotes an AF gate which passes only signals within an area used for focus detection of output signals of all pixels from the CDS/AGC circuit 107. Reference numeral 114 denotes an AF signal processing circuit as a first detector.

The AF signal processing circuit 114 extracts from signals having passed through the AF gate 113 a high-frequency component, a luminance difference component generated from the high-frequency signals (the difference between the maximum and the minimum of the luminance levels of the signals having passed through the AF gate 113), and the like to generate an AF evaluation value signal as first information. The AF evaluation value signal is output to a camera/AF microcomputer 115. The AF evaluation value signal (or an AF evaluation value) represents the sharpness (contrast state) of an image (picked-up image) generated on the basis of output signals from the image-pickup element 106. Since the sharpness varies with the focus state of the image-pickup optical system, the AF evaluation value signal (that is, the AF evaluation value) represents the focus state of the image-pickup optical system.

The camera/AF microcomputer 115 as a controller (hereinafter simply referred to as a microcomputer) controls the overall operations of the video camera and performs focus control, which controls the focusing driving means 112 to move the focus lens 105. The microcomputer 115 performs, as the focus control, focus control by a TV-AF method (hereinafter simply referred to as TV-AF control) and focus control by an external phase difference detection (external ranging) method (hereinafter simply referred to as external AF control).

TV-AF control is a focus control which monitors changes of the AF evaluation value signal with movements of the focus lens 105 and detects a focus lens position where the AF evaluation value signal is at the maximum to acquire an in-focus state.

Figure 3:
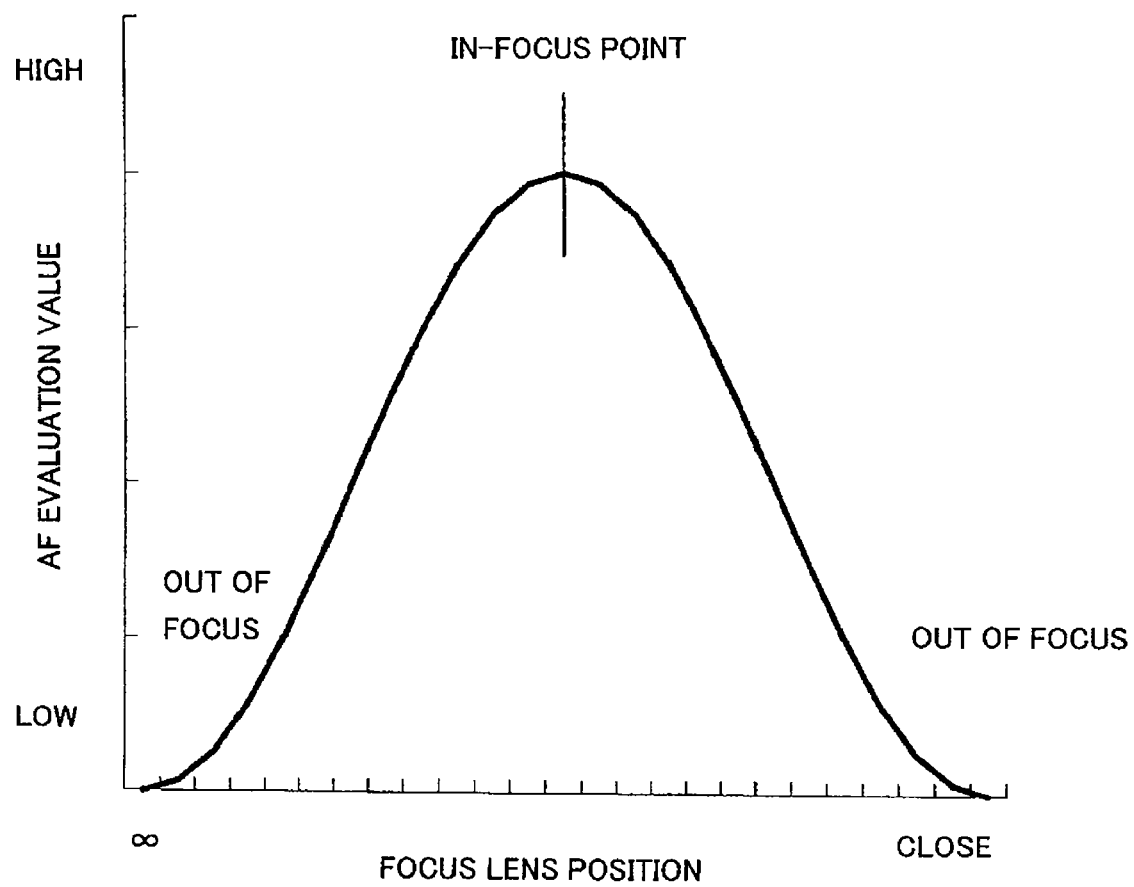
FIG. 3 is a graph for explaining the principle of TV-AF.

A high-frequency component of luminance signal components of video signals extracted with a band-pass filter for a certain band is generally used as an AF evaluation value signal. Such a high-frequency component changes in a manner as shown in FIG. 3 when the focus lens 105 is moved from the closest position to the infinity position while capturing an image of an object at a certain distance. In FIG. 3, the focus lens position where the AF evaluation value is at a maximum is the in-focus position (in-focus point) with respect to the object.

Figure 4:
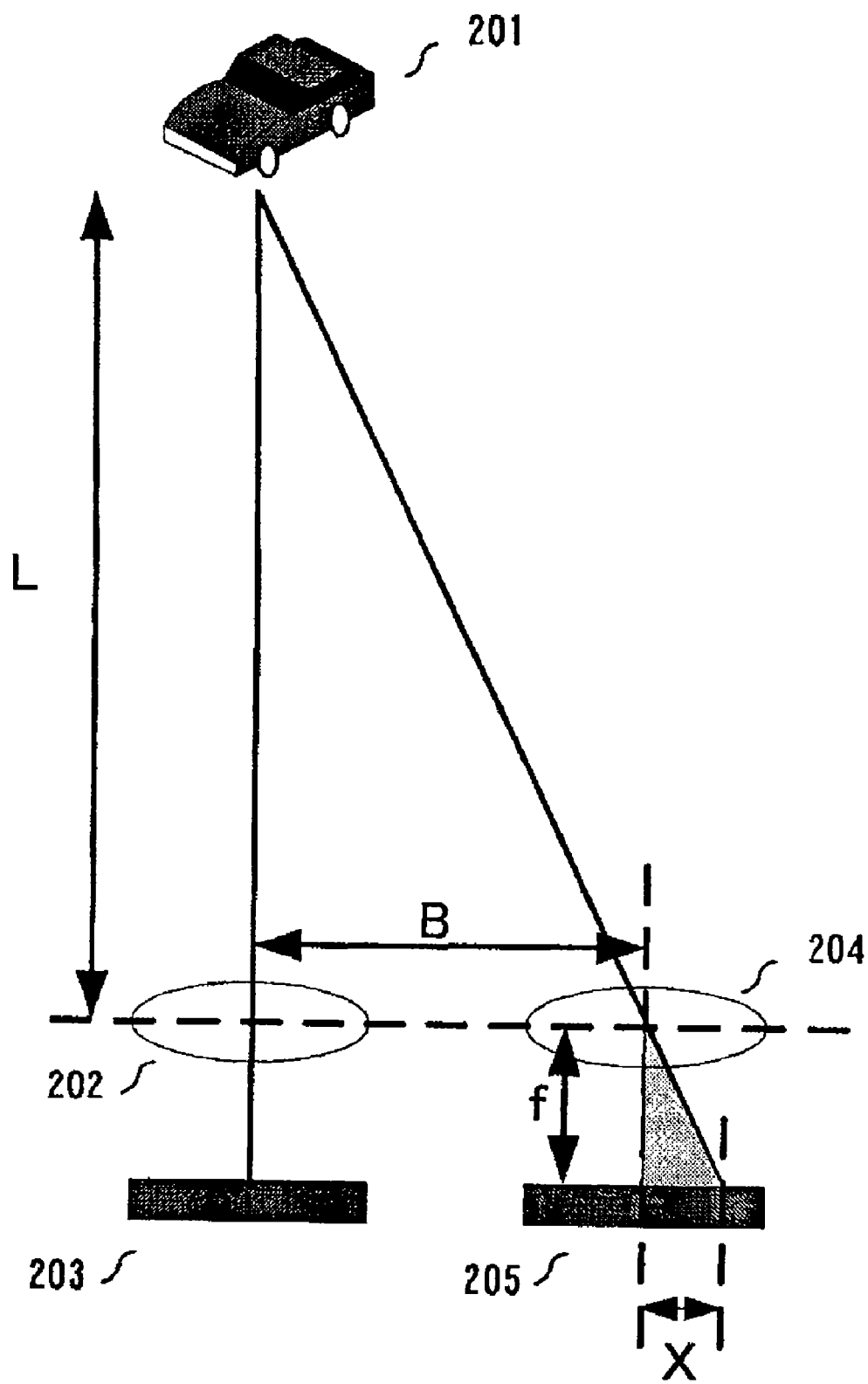
FIG. 4 is a view showing the principle of ranging by a passive phase difference method.
Figure 5:
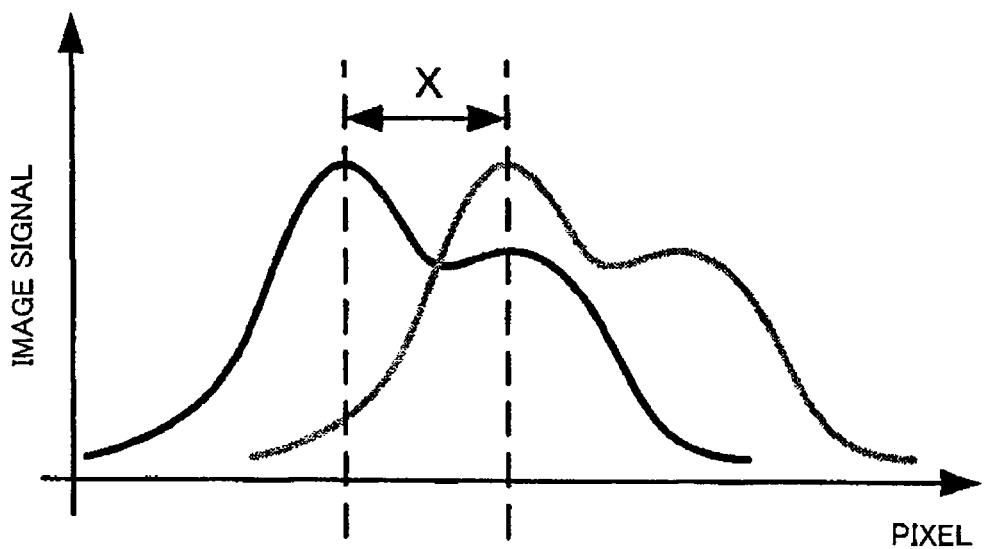
FIG. 5 is a graph showing image signals in the passive phase difference method.
Figure 6:
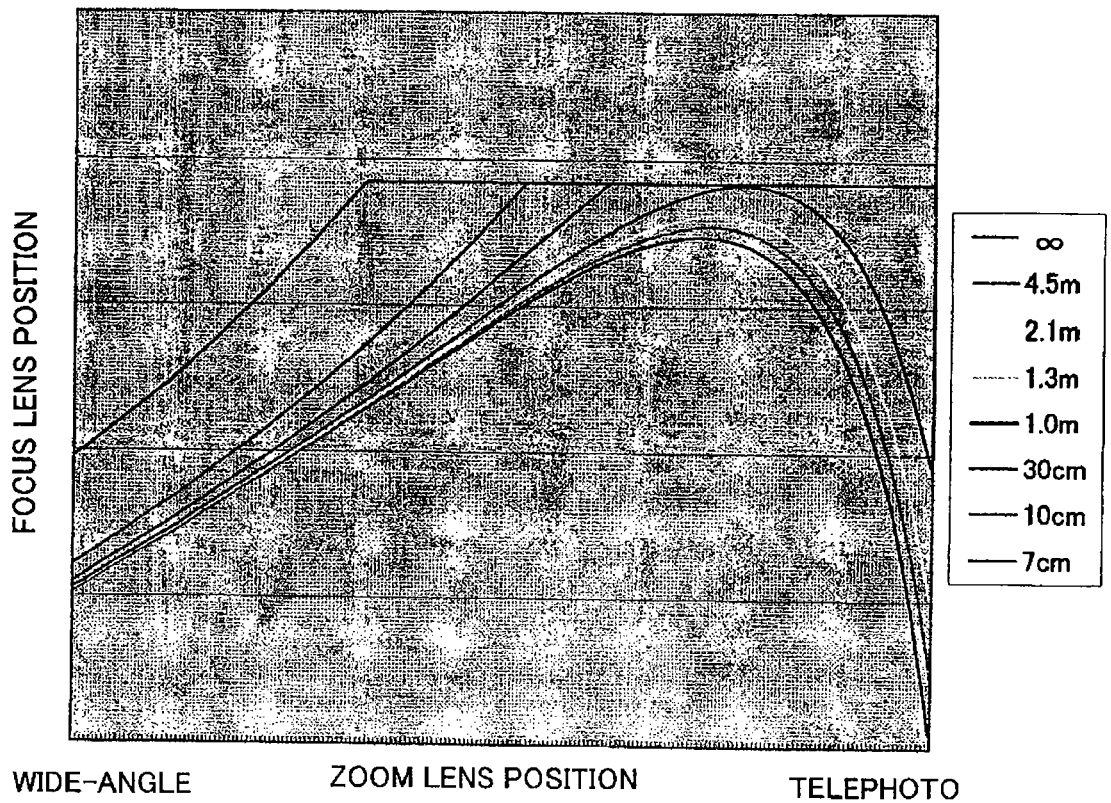
FIG. 6 is a graph showing the relationship between a magnification-varying lens position with respect to each object distance and a focus lens position in a rear focus lens.

Reference numeral 116 denotes an external ranging unit as a second detector, which measures a distance to an object and outputs a signal (second information, hereinafter referred to as information from the external ranging unit 116) corresponding to the distance. Various methods have conventionally been used as ranging methods. FIGS. 4 and 5 show the principle of ranging by a passive phase difference method that is one of these methods. The external ranging unit is provided separately from the image-pickup optical system. That is, a light flux which does not pass through the image-pickup optical system enters the external ranging unit from an object.

In FIG. 4, reference numeral 201 denotes an object, 202 denotes a first image-forming lens, 203 denotes a first light-receiving element array, 204 denotes a second image-forming lens, and 205 denotes a second light-receiving element array. The first and second light-receiving element arrays 203 and 205 are each constituted by a plurality of light-receiving elements (pixels) arranged in a line. The first and second light-receiving element arrays 203 and 205 are spaced apart from each other by a base length B.

A part of the light from the object 201, having passed through the first image-forming lens 202, forms an image on the first light-receiving element array 203 while another part of the light, having passed through the second image-forming lens 204, forms an image on the second light-receiving element array 205.

FIG. 5 shows an example of output signals (image signals) from the first and second light-receiving element arrays 203 and 205. Since the first and second light-receiving element arrays 203 and 205 are spaced apart from each other by the base length B, the image signal from the first light-receiving element array 203 and that from the second light-receiving element array 205 are shifted from each other by X pixels. Accordingly, it is possible to acquire X by calculating the correlation between the two image signals with shifts of pixels and determining the amount of pixel shift (also referred to as the phase difference) at which the correlation is at the maximum. Using X, the base length B, and a focal length f of the image-forming lenses 202 and 204, a distance L to an object can be calculated on the basis of the principle of triangulation by the following expression (1):

$$L = B \times f / X \quad (1).$$

Note that, in alternative embodiments of the present invention, a ranging method is not limited to the passive ranging method, that is, any other ranging method may be used. For example, a method which projects infrared rays and calculates an object distance on the basis of the principle of triangulation or a method which measures a propagation velocity of an ultrasonic wave using an ultrasonic sensor may be used as an active ranging method. Alternatively, the microcomputer may calculate an object distance on the basis of X by causing the external ranging unit to output a signal (the second information) corresponding to the amount X of pixel shift (phase difference) described above.

The information (second information) from the external ranging unit 116 is input to the microcomputer 115. The microcomputer 115 calculates on the basis of the input information a focus lens position (hereinafter referred to as an external in-focus position) where an in-focus state with respect to an object distance corresponding to the input information is obtained. The "calculation" herein includes not only computation using calculation expressions but also reading data of in-focus positions with respect to object distances stored in advance in a memory (not shown).

Figure 2:
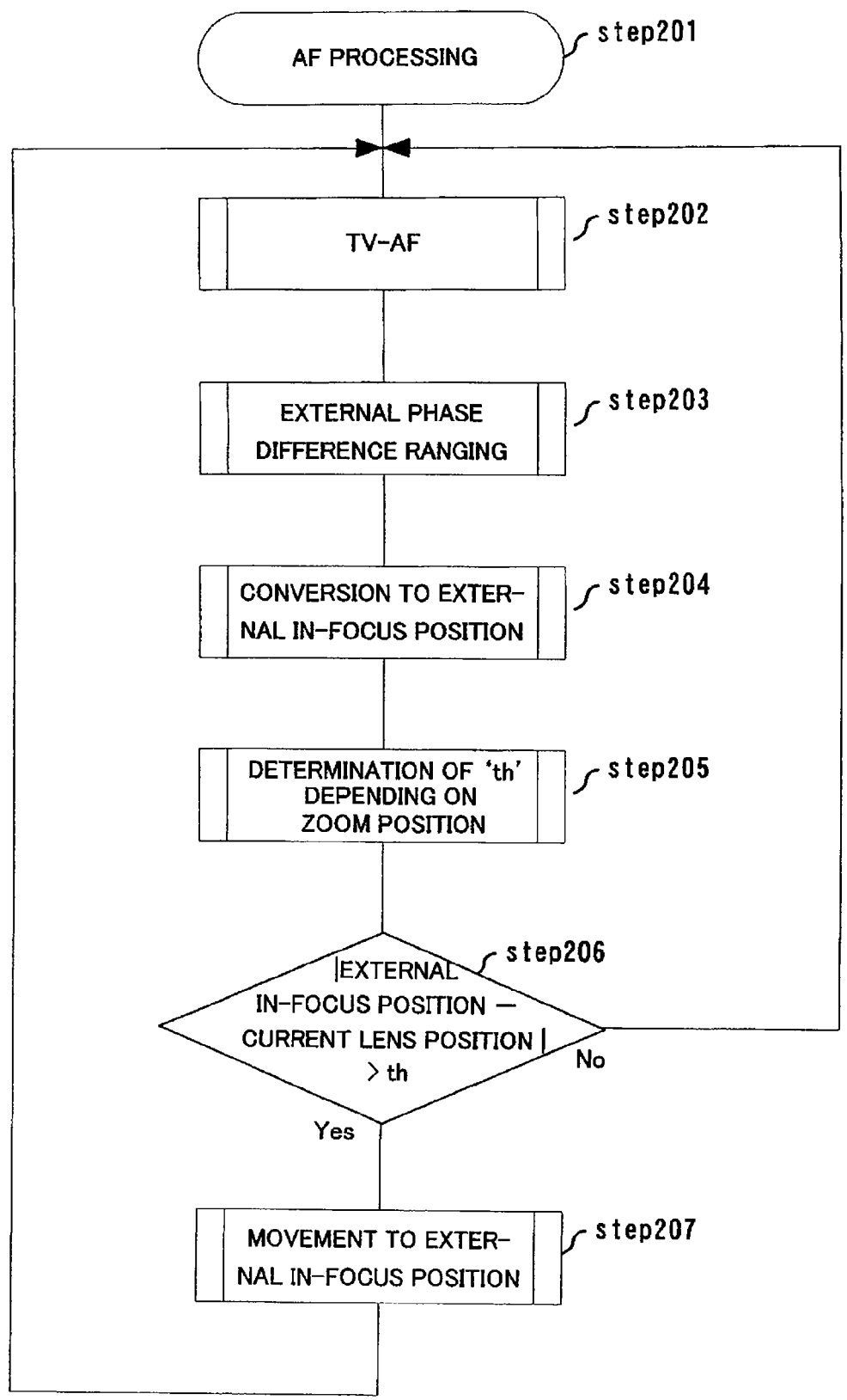
FIG. 2 is a flow chart showing the procedure for AF control in the embodiment.

AF processing (focus processing) to be performed by the microcomputer 115 will be described with reference to the flowchart in FIG. 2. The AF processing is executed in accordance with a computer program stored in the microcomputer 115.

First, in Step 201, the microcomputer 115 starts processing. The process shown in the flowchart is repeated, e.g., at intervals at which picked-up image signals from the image-pickup element 106 for generating an image of one field are read, i.e., periodically.

In Step 202, the microcomputer 115 executes the TV-AF control. The TV-AF control includes the operation of moving the focus lens 105 while monitoring the AF evaluation value to acquire an in-focus state. The TV-AF control also includes processing for maintaining an in-focus state, such as processing to determine whether or not a reduction in the AF evaluation value has occurred, in order to determine whether or not to drive the focus lens again.

In Step 203, the microcomputer 115 takes in the information from the external ranging unit 116.

In Step 204, the microcomputer 115 calculates an external in-focus position on the basis of the information acquired in Step 203.

In Step 205, the microcomputer 115 sets a predetermined lens position difference (first value) 'th' as a threshold value to be used in next Step 206, according to the position of the magnification-varying lens 102 (i.e., the focal length of the image-pickup optical system as third information). A lens position difference herein means the difference between the current position of the focus lens 105 detected by the focus position detector 112a and the external in-focus position.

The predetermined lens position difference 'th' is set to be larger on the telephoto side than on the wide-angle side. That is, the predetermined lens position difference 'th' is set such that it increases as the focal length becomes longer.

Figure 7:
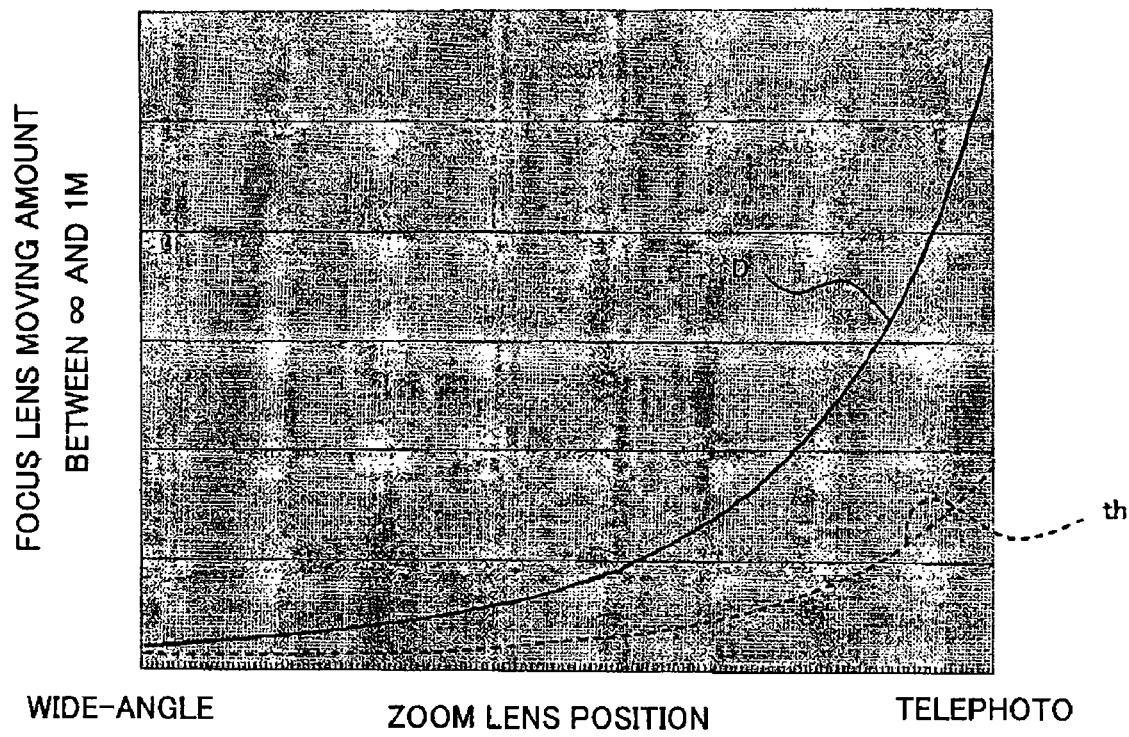
FIG. 7 is a graph showing the moving amount of a focus lens with respect to a predetermined object distance change in a rear focus lens and a lens position difference in the embodiment.

However, the predetermined lens position difference 'th' is not simply determined such that it is proportional to a lens position difference (curve D) corresponding to a predetermined object distance change, as indicated by a dashed line in FIG. 7. More specifically, the predetermined lens position difference 'th' is set such that its proportion to the lens position difference corresponding to the predetermined object distance change is lower on the telephoto side (e.g., ⅓ at the telephoto end) while the proportion is higher on the wide-angle side (e.g., ⅔ at the wide-angle end). This is because the use of external AF is increased with an emphasis on responsiveness on the telephoto side while the use of external AF is reduced with an emphasis on stability on the wide-angle side.

Note that a setting method for the predetermined lens position difference 'th' is not limited to the above-described one, in which it is set to be larger on the telephoto side than on the wide-angle side. The predetermined lens position difference 'th' may be appropriately changed depending on the focal length.

In Step 206, the microcomputer 115 compares the difference between the current focus lens position and the external in-focus position with the predetermined lens position difference 'th' set in Step 205. If the difference between the current focus lens position and the external in-focus position is larger than the predetermined lens position difference th, the flow advances to Step 207 to move the focus lens 105 to the external in-focus position by the external AF control. After that, the flow returns to the TV-AF processing in Step 202.

If the difference between the current focus lens position and the external in-focus position is smaller than the predetermined lens position difference 'th' in Step 206, the flow directly returns to the TV-AF processing in Step 202.

As described above, in this embodiment, focus lens driving is performed by the external AF control only when the difference between the current focus lens position and the external in-focus position is larger than the predetermined lens position difference 'th' during AF processing in which the TV-AF control is periodically repeated (i.e., between a point when the TV-AF control is performed in Step 202 and a point when the TV-AF control is performed in the same step in the next period). This enables to avoid frequent and discontinuous movements of the focus lens and make full use of the features of the external AF control such as good responsiveness and high-speed operation. In addition, after the external AF control, an in-focus state with high accuracy can be achieved by the TV-AF control.

In other words, under the condition that the difference between the focus lens position detected during the focus control using the first information and the in-focus position calculated using the second information is large to some extent, the focus lens is moved in a direction of the calculated in-focus position. This enables frequent and discontinuous movements of the focus lens to be suppressed to prevent a captured image from becoming unstable, and to realize an image-pickup apparatus having good responsiveness and performing focus control at high speed and with high focusing accuracy.

Furthermore, the change of the predetermined lens position difference 'th' depending on the magnification-varying lens position (focal length) enables to achieve a balance between responsiveness and stability in AF in any zooming state.

Although the above embodiment has described a hybrid AF method that is a combination of the external phase difference detection (external ranging) method and the TV-AF method, an alternative embodiment of the present invention may use a hybrid AF method that is a combination of an internal phase difference detection method and the TV-AF method. The internal phase difference detection method calculates the amount of defocusing using a phase difference between a pair of images formed by light fluxes having passed through an image-pickup optical system and then calculates the driving amount of the focus lens on the basis of the amount of defocusing.

In the internal phase difference detection method, the driving amount (and the driving direction) for moving the focus lens to an in-focus position is calculated, and an internal in-focus position can be calculated from the driving amount and the current focus lens position. Accordingly, it is possible to perform AF control in the same manner as in the embodiment described above.

The embodiment also has described a case where a focus lens is driven to the external in-focus position by the external AF control. However, a focus lens need not necessarily be driven to the external in-focus position. It is only necessary to move the focus lens in the direction of the external in-focus position.

Furthermore, the present invention is not limited to these preferred embodiments and various variations and modifications may be made without departing from the scope of the present invention.

This application claims foreign priority benefits based on Japanese Patent Application No. 2006-202000, filed on Jul. 25, 2006, which is hereby incorporated by reference herein in its entirety as if fully set forth herein.

What is claimed is:

1. An image-pickup apparatus configured to capture an image formed by an image-pickup optical system on an image-pickup element, the apparatus comprising:
   a first detector configured to generate first information corresponding to a contrast state of the captured image;
   a controller configured to repeatedly control a focus lens unit using the first information;
   a second detector configured to output a second information corresponding to an object distance; and
   a position detector configured to detect a position of the focus lens unit,
   wherein, while the controller is repeating the control of the focus lens unit using the first information,
   if a difference between the position of the focus lens unit detected by the position detector and an in-focus position calculated using the second information is a first value that is changed depending on third information corresponding to a focal length of the image-pickup optical system, the controller moves the focus lens unit towards the in-focus position calculated using the second information, and
   if the difference is a second value that is less than the first value, the controller repeats the control of the focus lens unit using the first information without using the second information.

2. An image-pickup apparatus according to claim 1, wherein, while the controller is repeating the control of the focus lens unit using the first information,
   if the difference between the detected position of the focus lens unit and the in-focus position calculated using the second information is the first value, the controller moves the focus lens unit to the calculated in-focus position.

3. An image-pickup apparatus according to claim 1, wherein the controller sets the first value such that the first value increases as the focal length corresponding to the third information becomes longer.

4. An image-pickup apparatus according to claim 1, wherein the controller moves the focus lens unit towards the in-focus position calculated using the second information and then performs the control of the focus lens unit using the first information.

5. A focus control method which is used for an image-pickup apparatus configured to capture an image formed by an image-pickup optical system on an image-pickup element, the method comprising the steps of:
   acquiring first information corresponding to a contrast state of the captured a image;
   repeatedly controlling a focus lens unit using the first information;
   acquiring second information corresponding to an object distance; and
   detecting a position of the focus lens unit,
   wherein, in the control step, while the control of the focus lens unit using the first information is repeated,
   if a difference between the detected position of the focus lens unit and an in-focus position calculated using the second information is a first value that is changed depending on third information corresponding to a focal length of the image-pickup optical system, the focus lens unit is moved towards the calculated in-focus position, and
   if the difference is a second value that is less than the first value, the control of the focus lens unit using the first information is repeated without using the second information.

* * * * *